United States Patent [19]
Schulze et al.

[11] Patent Number: 5,477,877
[45] Date of Patent: Dec. 26, 1995

[54] OVERTEMPERATURE SHUT-OFF VALVE WITH SEALING SPRING FOR AUTOMATICALLY SHUTTING OFF CONDUITS

[75] Inventors: Klaus Schulze, Gernrode; Henning Lörchner, Ditfurt, both of Germany

[73] Assignee: Mertik Maxitrol GmbH & Co., KG, Germany

[21] Appl. No.: 218,623

[22] Filed: Mar. 25, 1994

Related U.S. Application Data

[63] Continuation of PCT/EP92/02190, Sep. 22, 1991

[30] Foreign Application Priority Data

Sep. 25, 1991 [DE] Germany .......................... 41 31 859.5

[51] Int. Cl.⁶ ................................................. F16K 17/38
[52] U.S. Cl. ............................ 137/72; 137/75; 137/457
[58] Field of Search ............................ 137/72, 75, 457

[56] References Cited

U.S. PATENT DOCUMENTS

| 2,707,965 | 5/1955 | Allen ......................................... 137/75 |
| 3,720,220 | 3/1973 | McMath . | |

FOREIGN PATENT DOCUMENTS

| 0118152 | 9/1984 | European Pat. Off. . | |
| 0343615 | 5/1989 | European Pat. Off. . | |
| 0364906 | 4/1990 | European Pat. Off. . | |
| 0574677 | 12/1993 | European Pat. Off. . | |
| 1019879 | 4/1958 | Germany . | |
| 1429056 | 6/1971 | Germany . | |
| 3916100 | 11/1990 | Germany . | |
| 9017534 | 3/1991 | Germany . | |
| 536051 | 5/1941 | United Kingdom ..................... 137/75 |
| 549406 | 11/1942 | United Kingdom ..................... 137/75 |

*Primary Examiner*—John C. Fox
*Attorney, Agent, or Firm*—Harness, Dickey & Pierce

[57] ABSTRACT

The described invention takes as its basis the problem of developing an overtemperature shut-off valve which guarantees a reproducible gas-tight seal. The problem is solved in that the metal closure body (11) has a spherical shape at least in its sealing area and its diameter is selected so as to form a slight tight fit with the diameter of a valve seat which is in the form of a bore (21) shaped in the housing (1) of the valve when the valve is closed. A second bore (20) extends in the direction of the first bore (21) is arranged upstream thereof. A guide (19) that tapers outwardly in the direction of the closure body (11) when it is in its open position is located between the closure body and the second bore (20). As the temperature of the closure member increases due in part to heat transferred thereto from the housing after it moves into a closed position, the resulting thermal expansion will result in a wedging or pressfit type sealing relationship being created between the closure member, bore 21 and/or bore 20. This wedged or pressfit sealing relationship will ensure that the valve remains closed even in the event the biasing spring force is relaxed due to increased temperature or the like or the valve is subjected to severe shocks or concussions.

20 Claims, 10 Drawing Sheets

5,477,877

OVERTEMPERATURE SHUT-OFF VALVE WITH SEALING SPRING FOR AUTOMATICALLY SHUTTING OFF CONDUITS

RELATED APPLICATION

This is a continuation of International Application No. PCT/EP92/02190, filed Sep. 22, 1992.

BACKGROUND SUMMARY OF THE INVENTION

The invention concerns an over temperature shut-off or fire-protection valve with a sealing-spring for automatically shutting-off conduits, especially gas conduits. Such valves are used in piping e.g. upstream of gas-fittings, gas equipment and gas meters etc. Their purpose is, in cases of an excessively high temperature condition such as fire, to cut-off gas supplies before the temperatures in the immediate vicinity of the previously named gas equipments becomes excessive.

Presently, primarily valves are used whose closure bodies are conical or spherical.

A valve is known, as given in EP-OS 118 52, by which a cone is held either in the closed position on reaching a limiting temperature or in the open position by a spring on one side and an alloy with thermal shape-memory properties on the other side, whereby the spring is formed such that after closing, self-opening is not possible.

With this solution, it is a disadvantage that if the spring loses its strength at very high temperatures, safe sealing is no longer guaranteed.

EP-OS 118 52 also describes a valve whose closure body is a sphere. With this solution, a guide rod which penetrates a valve cap is connected to a sphere with a fusible body, which is held tightly to the cap by a compression spring. As soon as the fusible body melts, the guide rod is drawn out of the cap such that the sphere can move abruptly, due to the compression spring, in the closure direction.

Also with this solution, it is a disadvantage that if the spring loses its strength due to very high temperatures, safe sealing is no longer guaranteed. In addition, this solution has the shortcoming that to achieve the required gas-tightness, the sphere and its seating must fit exactly with respect to roundness and surface quality. This leads on the one hand to very high production costs and on the other hand to the fact that the gas-tightness of this combination is not reproducible. With renewed application, which is generally done by rotating the sphere, a completely different leakage rate is achieved particularly if the roundness of both components is not perfect. For this reason gas-tightness tests also performed during production do not bring the desired success, as only very high leakage rates can be guaranteed.

The present state-of-art solutions for usage with throughway valves, e.g. as described in DE-OS 39 16 100, by which the closure body is moved vertically to the flow direction, are especially unsatisfactory. This results in components or profiles protruding from the piping profile. When using a sphere, it is additionally necessary to machine together both sides of the sphere skin sealing surfaces together which leads to very high production costs.

The resulting high price of these valves has previously prevented their otherwise desired general usage.

The present invention takes as its basis the problem of developing a valve of the named type that guarantees a reproducible tight seal. Even when the elasticity loses strength at very high temperatures, it is to be ensured that the valve itself remains closed whether due to shock or vibration. Additionally the valve is to be designed such that there are no components which protrude from the piping profile. Thus the valve according to the invention can be fitted directly into piping systems. Likewise normal stopcocks should be able to be operated without difficulty. Manufacturing costs are additionally to be held as low as possible.

According to the invention, the problem is solved by the named characteristics in the marked part of the Patent claim 1. The resulting advantage of the invention is especially that it is ensured that the valve maintains its gas-tight closure position after closing even in the event of failure of closure springs due to high temperature and by shock, and that a reproducible gas-tight seal is guaranteed. Additonally the valve is designed such that no components protrude from the piping profile and therefore the valve, according to the present invention, can be fitted directly into piping systems and normal stopcocks can be operated without difficulty.

Advantageous arrangements are given in Patent claims 2 to 9. The present invention provide a simple design through which production costs can be kept very low. Realization examples of the invention are given in drawings and given in detail as follows:

DESCRIPTION OF THE PREFERRED EMBODIMENTS

Figure 3:
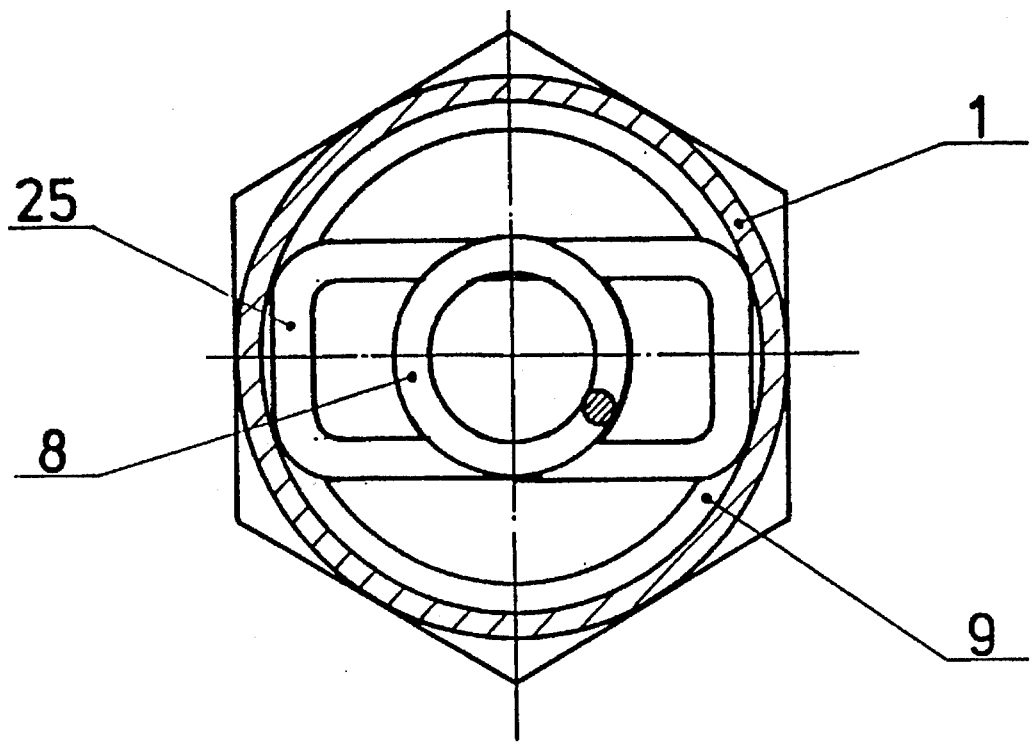
FIG. 3 is a section view of the valve shown in FIG. 1, the section being taken along line C—C.
Figure 4:
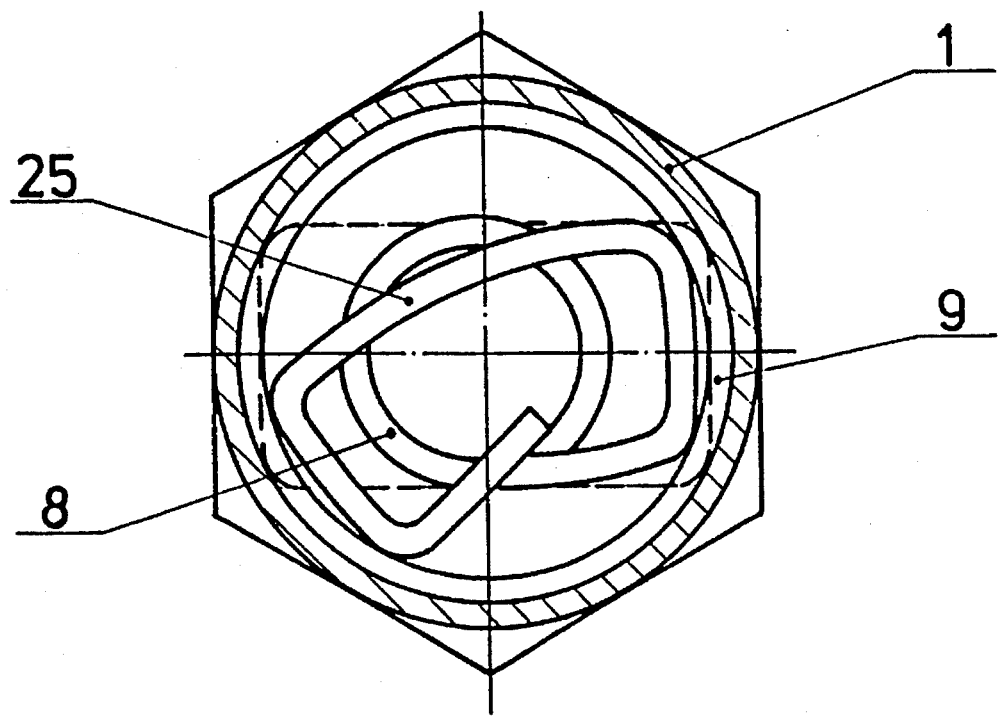
FIG. 4 is a section view of the valve shown in FIG. 1, the section being taken along line C—C but showing the compression spring as it is being installed.

The fire-protection valve, in accordance with the present invention as shown in the drawings and explained in detail in the following, has a tubular housing (1) having a connection at each end by which it may be connected to a fluid flow line such as a gas conduit. In this case the connections shown have an inner thread at one end and an outer thread at the other. It is obvious that other connections are possible. In the axial projection of the inner thread, which serves as an intake (2), a tubular extension (3) is connected to the inner thread in housing (1). One end of closure spring (8), which has the function of a compression spring, is seated on the first stage shoulder (9), formed by the junction of intake (2) and extension (3). This seated end of spring 8 juts over its external diameter and/or is deformable in the spring's longitudinal axis. The end of the closure spring therefore represents, in this case, a rounded rectangle whose long axis is deformable to the spring's longitudinal axis and thus on the one hand enables a problem free assembly of the closure spring (8) as shown in FIG. 4 and on the other hand provides a safe support for closure spring (8) as shown in FIG. 3.

The other end of closure spring (8) is supported by the top surface of metal closure body (11) which advantageously has an additional groove (26) around its surface for this purpose.

The metal closure body (11) has a spherical shape in the sealing area. It is seated in the open position on three fixed points formed by two ball bearings (27) and a temperature sensitive component (28) under the force of closure spring (8). Thereby it is advantageous if both ball-bearings, which themselves are supported by second stage (13) in housing (1), are spaced from each on such that they form an aperture angle of 90°. Opposite this aperture angle, a temperature sensitive component (28) is mounted on the inner wall of housing (1).

The temperature sensitive component (28) consists of an inwardly opening cup (15) which is attached to the inner wall (7) by its cup base (16). In the inwardly radially opening cup (15), a solder pellet (17) is located into which a clearance fit ball-bearing with the same dimensions as the cup aperture is embedded. This constitutes the third fixed point. The ball bearing and cup are dimensioned such that the ball-bearing can move into the cup (15) if the solder rod (17) is missing but is supported by and projects outwardly therefrom a slight amount as shown when the solder rod is present.

The support diameter formed by the three fixed points for the metal closure body (11) is dimensioned such that closure body (11) is supported in an open position but maybe pressed through the resulting enlarged opening between the three fixed points due to the force of the closure spring, should ball-bearing (18) be allowed to move into cup (15).

Figure 1:
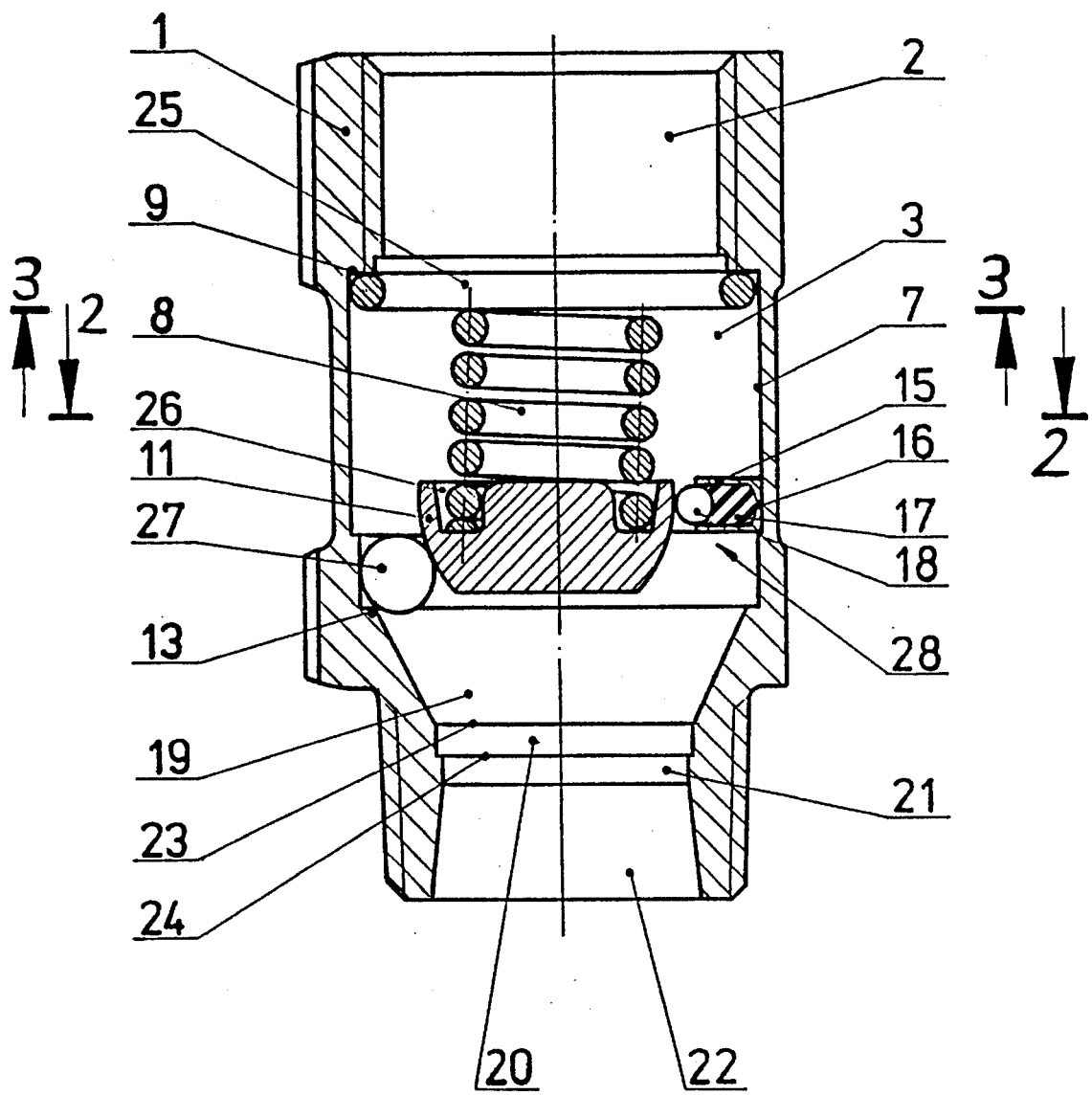
FIG. 1 shows an example of a Fire Protection Valve in accordance with the present invention, the view being a sectional view taken along line A—A of FIG. 2 with the valve shown in an open position.

A tapered spherical guide (19) connects second stage (13) in the closure direction of closure body (11) to tubular extension (3). The guide (19) passes into bore (20), which together with closure body (11) preferably has a clearance fit of approx. 20 mm, on to which a further axially aligned bore (21) is connected. Bore (21), together with the closure body (11) preferably has a moulding fit of approx. 0.04 mm. Thereafter, the necessary outlet (22) of housing (1) may be found (FIG. 1).

Figure 8:
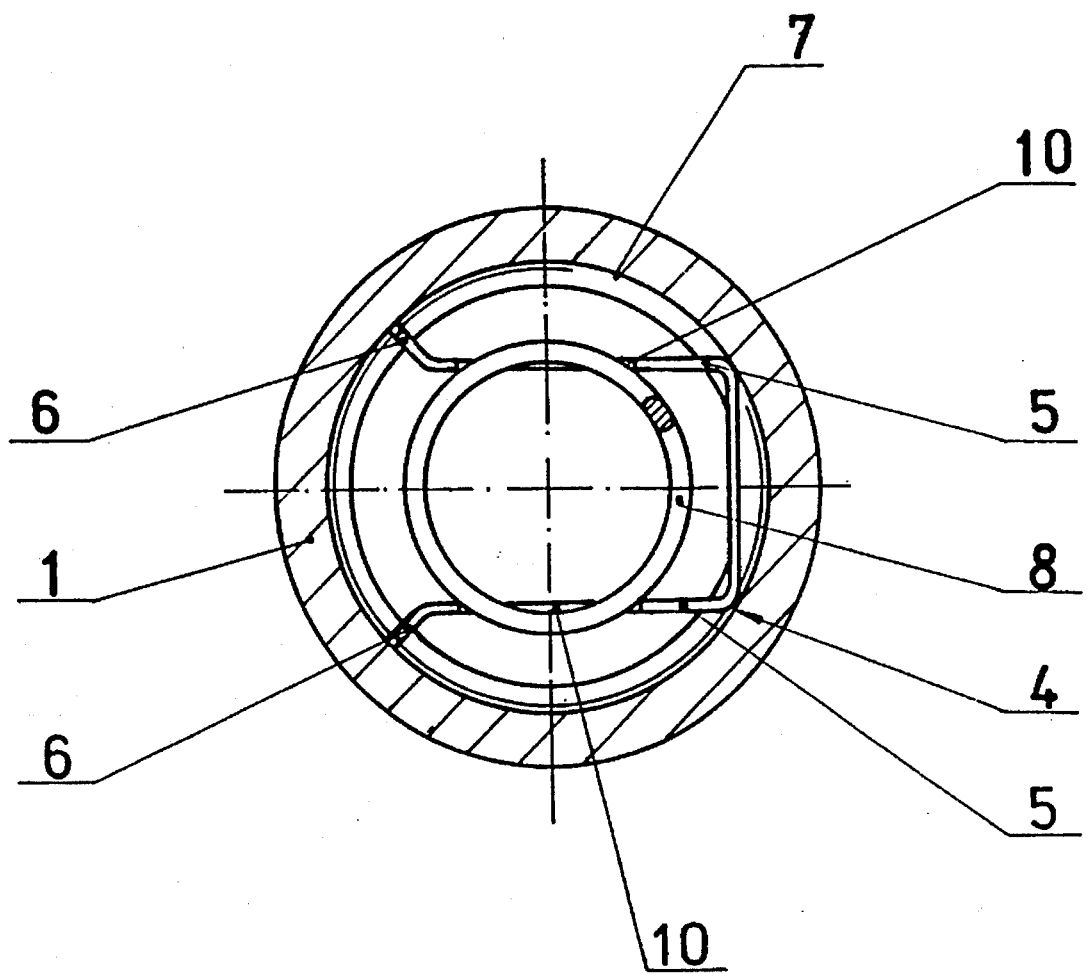
FIG. 8 is a section view of the valve shown in FIG. 5, the section being taken along line E—E thereof.

The fire-protection valve of the present invention shown in FIG. 5 and explained in detail as follows has a U-shaped bent clip (4) in its tubular extension (3), which with both its shanks (5) (preferably having angled ends (6)) is resiliently splayed against inner wall (7) of housing (1). Thereby clip (4) is made as a curved sheet metal component whose surfaces run parallel to the housing axis lying in the flow direction and thus also parallel to inner wall (7) of housing (1) on which the surfaces partly lie. Hereby clip (4) creates minimal flow resistance. The closure spring (8) axially aligned in housing (1) is supported on both shanks (5) of clip (4) through which clip (4) is pressed against first stage (9) formed by extension (3). For better fitting and centering of closure spring (8), both shanks (5) have each a recess (10) whose length is advantageously sized such that after closure spring (8) locks in position, a compression of clip (4) and its sliding out of housing (1) is not possible (FIG. 8). Additionally the sidewalls of recess 10 are positioned in close proximity to closure spring 8 to retain same in its desired position.

Figure 11:
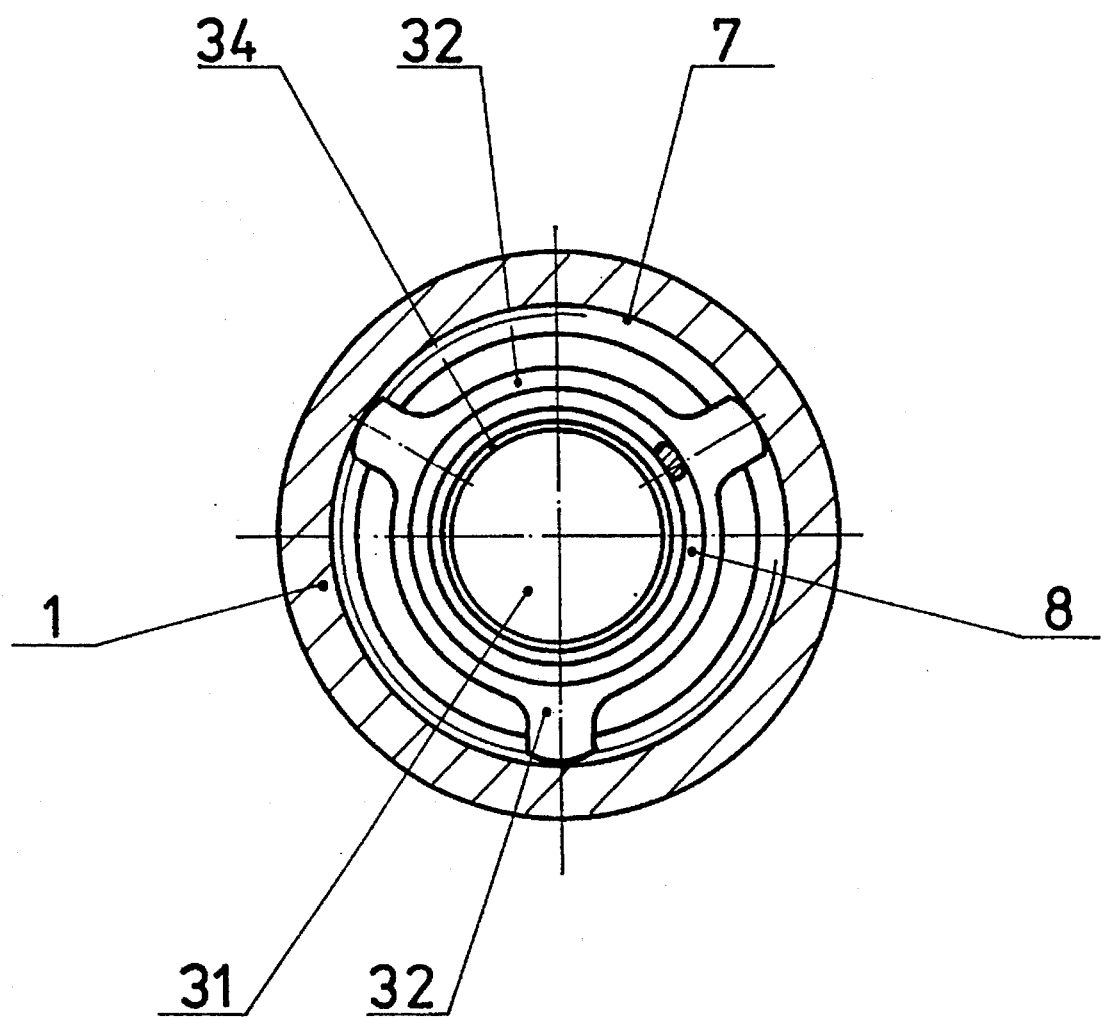
FIG. 11 is a section view similar to that of FIG. 8 but showing the valve of FIG. 5 with a modified clip.

Another form of the clip is shown in FIG. 11. In this case the clip consists of a disk (32) which has three regularly spaced radial arms (33). These arms are resiliently deformed during assembly such that the external diameter reduces and spreads out again after reaching extension (3). Due to closure spring (8), disk (32) presses against the first stage shoulder 9 found in housing (1). To achieve as large a flow cross-section as possible, disk (32) has additionally an axial aperture (31), which preferably has the form of a passage whose flange 34 rises in the direction of closure spring (8) and thus serves as an axial guide for closure spring (8).

Figure 5:
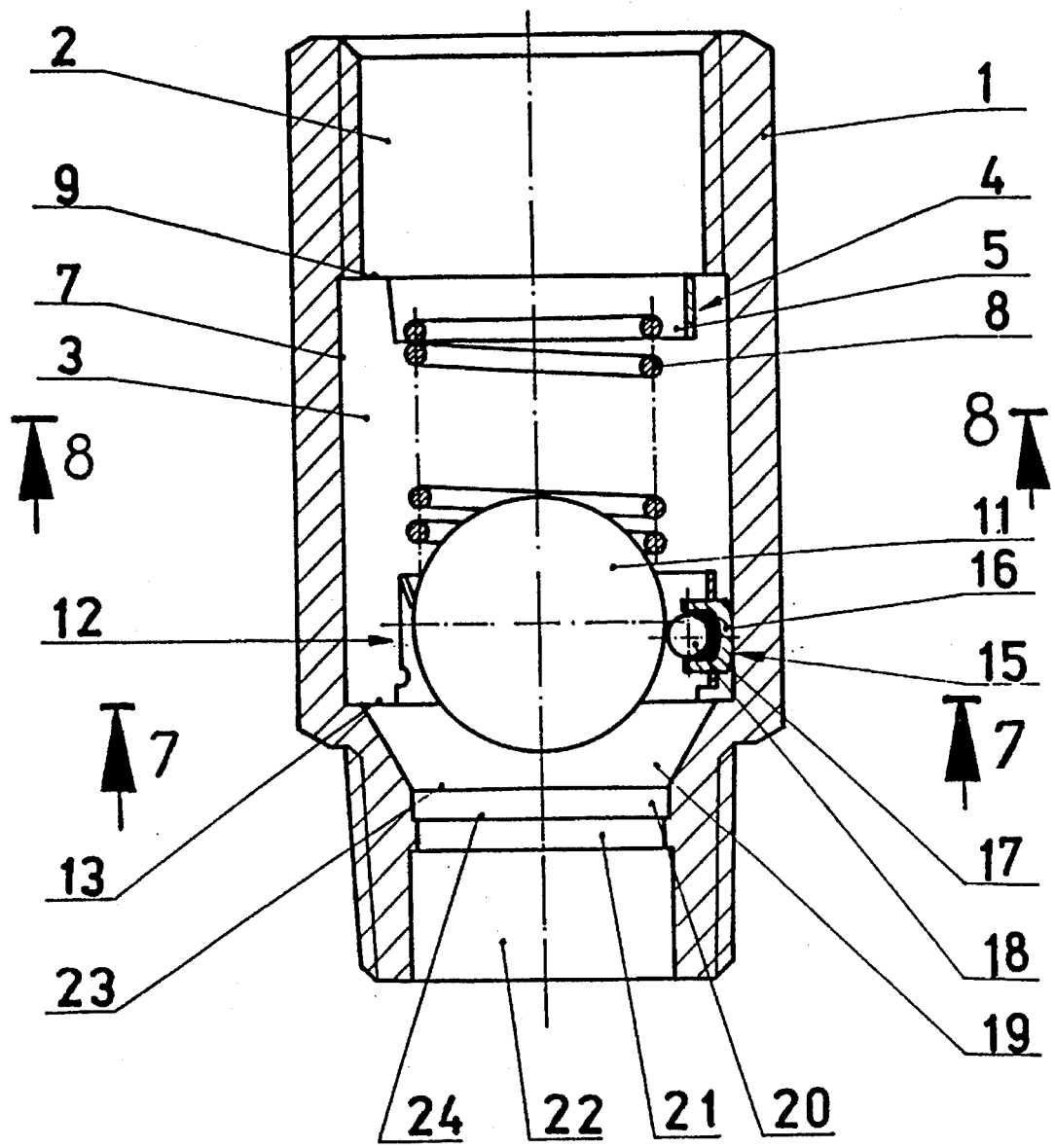
FIG. 5 is a further example of a Fire Protection Valve in accordance with the present invention, the view being a section view similar to FIG. 1 and showing the valve in an open position.

The other end of closure spring (8) seats itself on a ball forming closure body (11) which itself lies on hoop (12) supported by second stage (13) which forms the end of extension (3) (FIG. 5).

Figure 7:
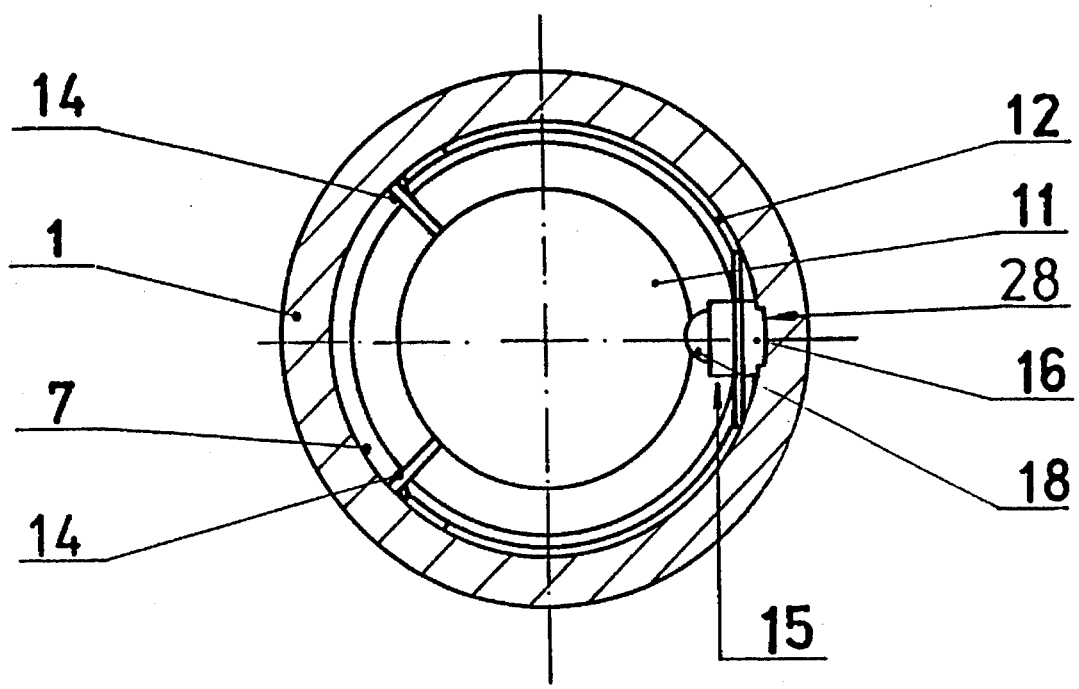
FIG. 7 is a section view of the valve shown in FIG. 5, the section being taken along line D—D thereof.

The ring-shaped bowed hoop (12), which is also made as a curved sheet metal component whose surfaces run parallel to the housing axis lying in the flow direction and thus also parallel to the inner wall (7) of housing (1) on which the surfaces partly lie in order to create a minimal flow resistance, is offset at its opposite ends radially inwards (FIG. 7). Hereby it is advantageous if hoop (12) in the area of the offset edges of both ends (14) on the supporting side in stage (13) each have a notch of the type such that the length of the offset ends (14) can be maintained very exactly independent of the variations in offset location due to manufacturing techniques. Whilst the edges of both ends (14), each pointing radially outwards, are pressed resiliently against inner wall (7) of housing (1), both ends (14) of hoop (12) otherwise form a fixed point for accommodating the sphere formed by closing body (11).

It is advantageous to select a distance between the fixed points such that the an hoop (12) is approx. 90°. The temperature sensitive component (28) is mounted approximately midway between ends 14 of hoop 12 and opposite the hoop aperture in hoop (12) such that the cup base (16) lies on the inner wall (7) of housing (1) e.g. pressed in an available bore in hoop (12).

Figure 9:
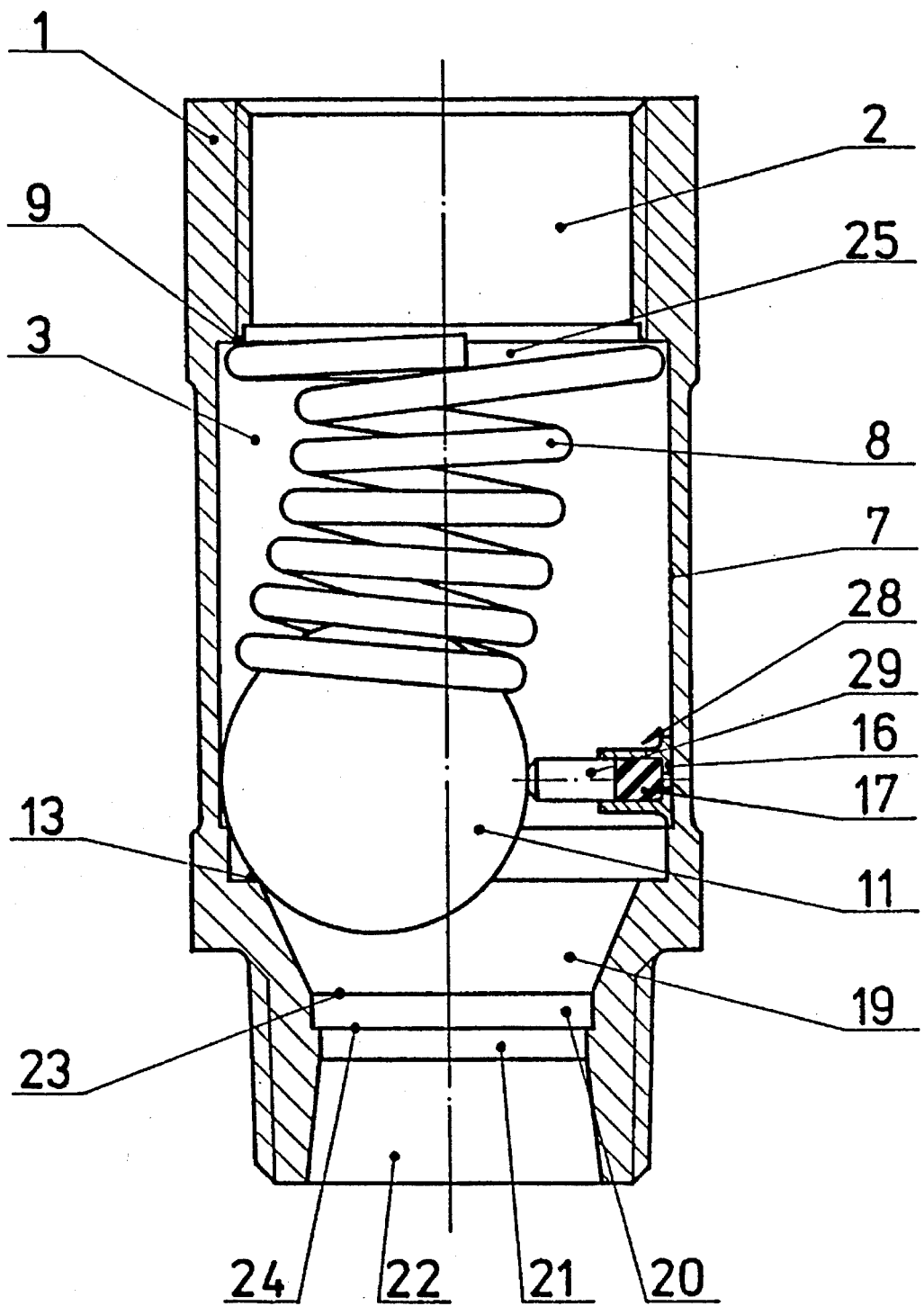
FIG. 9 is a further example of a Fire Protection Valve in accordance with the present invention, the view being a section view similar to FIGS. 1 and 5 and showing the valve in an open position.

In a further version example shown in FIG. 9, the sphere which constitutes closure body (11), is only held so far from the centre by the temperature sensitive component (28) mounted on inner wall (7) that it is seated in the open position on second stage (13). In order to realize higher strokes by the temperature sensitive component (28), it has a bolt (29) instead of a ball-bearing (18) as in the previous example.

Figure 2:
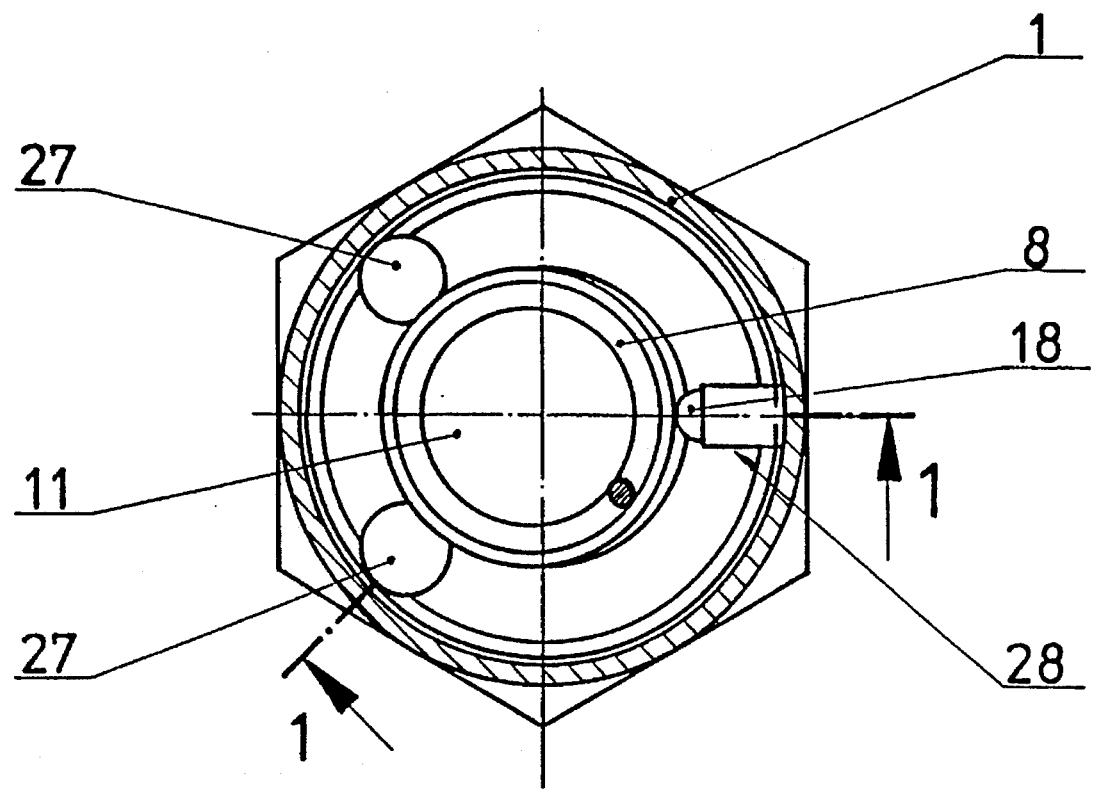
FIG. 2 is a section view of the valve shown in FIG. 1, the section being taken along line B—B thereof.
Figure 10:
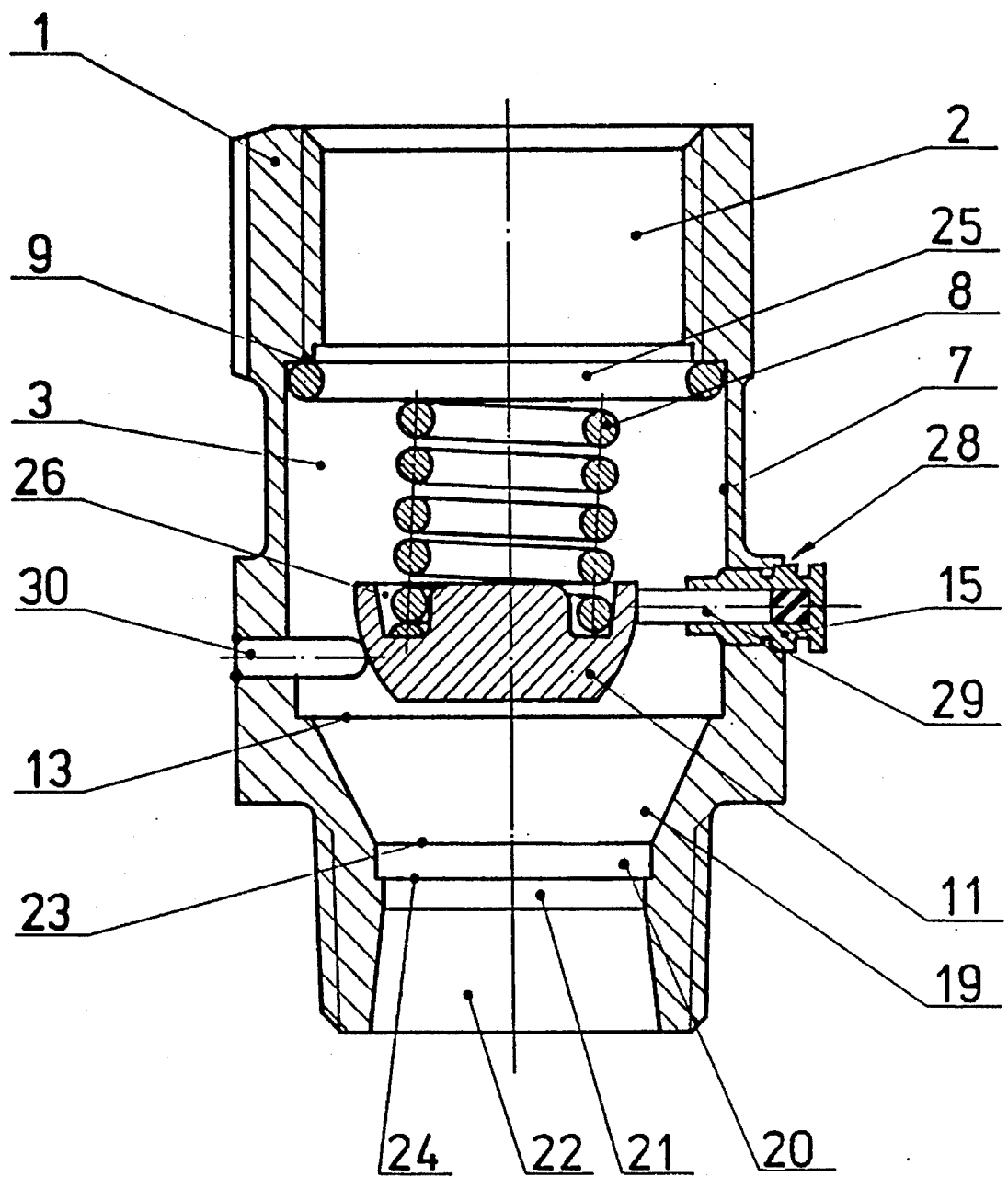
FIG. 10 is a further example of a Fire Protection Valve in accordance with the present invention, the view being a section view similar to FIGS. 1, 5 and 9 and showing the valve in an open position.

In comparison, closure body (11) in the example shown in FIG. 10 is seated on two studs (30) in addition to the temperature sensitive component (28) with bolt (29). The studs (30) are arranged analogue to the ball-bearings (27) in FIG. 2 but jut, however, into housing (1) from outside. Additionally it can be seen in this example that cup (15) of the temperature sensitive component (28) is screwed into housing (1) such that replacement is possible without problems.

It is common to all the named example versions, which can of course be combined with each other, that the closure body (11) under pressure from closure spring (8) is seated on three fixed points including the temperature sensitive component (28) whereby the fire-protection valve is completely open (FIGS. 1, 5, 9 and 10). Should the temperature of housing (1) and thus the temperature sensitive component (28) lying on inner wall (7) rise, then on reaching the melting point of the solder (17), the ball-bearing (18) or bolt (29) embedded in the solder (17) is pressed into cup (15) such that the closure body (11) is forced by closure spring (8) through the enlarged opening arising between the three fixed points. The spherical guide (19) thereby centres closure body (11) on the seat axis.

For reliable operation, bore (20), with a clearance fit of the closure body (11) and located before bore (21), is especially important. In previous usual solutions, on closing, the closure body (11) is moved suddenly against the valve seat whereby the body always impacts the seat in a position other than in the final closed position.

Figure 6:
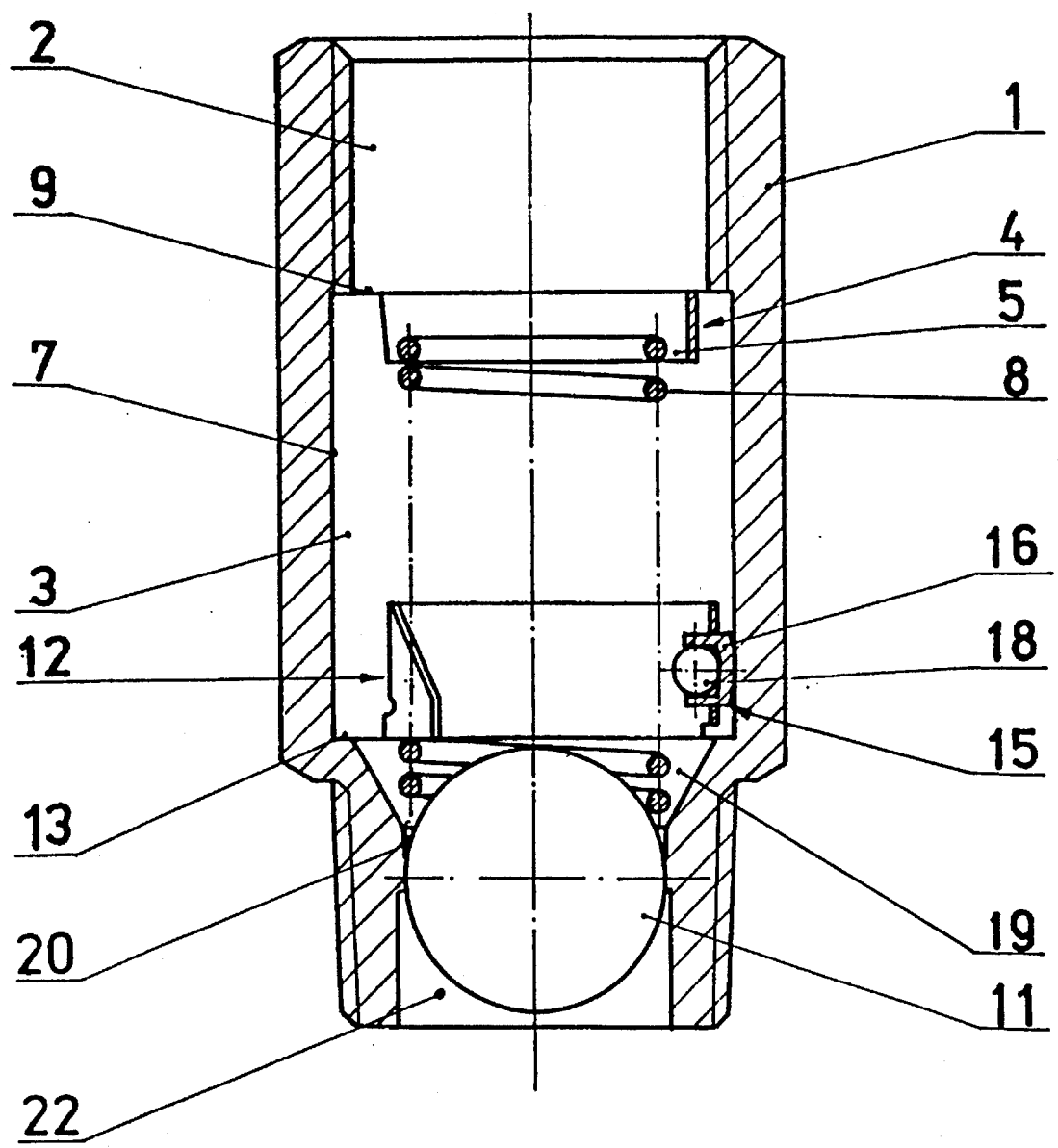
FIG. 6 is a section view similar to that of FIG. 5 but showing the valve thereof in a closed position.

In fire-protection valves, on account of their high temperature loading of approx. 1000° C., both the valve seat and closure body (11) must be metal. Because of this, deformations in the sealing surface area occur in previous types of fire-protection valves which due to static spring pressure in the closed position can no longer be obviated. This may be seen as the cause for the unsatisfactory and non-reproducible gas-tight results already described earlier. With the fire-protection valve of the present invention, the upper edge (23) of bore (20) absorbs this central impact. With the pre-requirement that closure body (11) consists of a harder material than that of housing (1), then only edge (23) is damaged. The damage occurring to edge (23) does not however affect the final closed position of closure body (11) in bore (21) (FIG. 6)

Since bore (21) with closure body (11), as described previously, form a tight moulding fit, self-blocking can take place even by light pressure of the closure body (11) in the upper rim (24) of bore (21). Due to available kinetic energy however, closure body (11) is pressed into bore (21).

On the grounds that closure body (11), in the open position, is only in point-contact with housing (1) via the three named fixed points described above (FIG. 2), it is, in cases of fire, always colder than housing (1). After sudden closure, the closure body (11) rapidly acquires the temperature of housing (1) whereby the moulding fit increases such that a practically gas-tight connection results which no longer requires the closure spring (8) and is locked against shock and/or concussions.

We claim:

1. An overtemperature shut-off valve for use in automatically shutting off fluid flow in a conduit in response to an excessive temperature comprising:

a housing having a fluid flow passage extending therethrough, said passage including a first portion of a predetermined size and a second portion defining a valve seat;

a closure member movably disposed in said first portion;

biasing means within said housing for biasing said closure member into sealing engagement with said valve seat; and means for supporting said closure member in said first portion of said housing against the biasing action of said spring to enable fluid flow through said valve, said means including a temperature sensitive element operative to release said closure member in response to said excessive temperature, said closure member being moved into sealing engagement with said valve seat by said biasing means upon release by said temperature sensitive element, said valve seat being sized relative to said closure member such that said closure member forms a moulded fit relationship within said valve seat upon engagement therewith to thereby assure a fluid tight seal.

2. An overtemperature shut-off valve as set forth in claim 1 wherein said support means is operative to support said closure member in spaced relation to said housing whereby heat transfer from said housing to said closure member is minimized.

3. An overtemperature shut-off valve as set forth in claim 2 wherein said support means includes a plurality of projections extending into said first portion of said passageway, said projections engaging said closure member at spaced locations around the periphery thereof.

4. An overtemperature shut-off valve as set forth in claim 1 wherein said biasing means extends between a biasing means seat provided at one end of said housing and said closure member.

5. An overtemperature shut-off valve as set forth in claim 4 wherein said biasing means includes a first portion engaging said biasing means seat and a second portion, said second portion being positioned in spaced relationship to said housing to thereby reduce heat transfer from said housing to said second portion.

6. An overtemperature shut-off valve as set forth in claim 1 wherein said valve seat is sized relative to said closure member such that said closure member forms a tight fit with said valve seat upon movement of said valve member into engagement with said valve seat.

7. An overtemperature shut-off valve as set forth in claim 6 wherein heat transferred from said housing to said closure member through said valve seat when said valve member is in a closed position results in thermal expansion of said closure member within said valve seat to thereby increase the sealing engagement therebetween.

8. An overtemperature shut-off valve as set forth in claim 1 wherein said support means include one or more ball bearings spaced around the periphery of said closure member.

9. An overtemperature shut-off valve as set forth in claim 1 wherein said support means includes a plurality of studs mounted on an inner wall of said housing and engageable with said closure member.

10. An overtemperature shut-off valve as set forth in claim 1 wherein said support means includes a ring shaped hoop seated within said first portion of said passage, said hoop including means extending generally radially inwardly and into supporting engagement with said closure member.

11. An overtemperature shut-off valve as set forth in claim 1 wherein said temperature sensitive element is supported in heat transfer relationship by said housing.

12. An overtemperature shut-off valve as set forth in claim 11 wherein said temperature sensitive element includes a housing, a meltable material disposed within said housing and a support member supported by said meltable material, said support member being in engagement with said closure member.

13. An overtemperature shut-off valve as set forth in claim 12 wherein said meltable material is yieldable when subjected to said excessive temperature and said support member moves out of engagement in response to yielding of said meltable material to thereby release said closure member.

14. An overtemperature shut-off valve as set forth in claim 1 wherein said biasing means comprises a helical coil spring and said valve includes a bowed clip splayed against the inner wall of said housing, said clip including recesses interlocking with one end of said spring to retain said spring in position and to retain said clip in said splayed position.

15. An overtemperature shut-off valve as set forth in claim 14 wherein said bowed clip includes sidewall surfaces extending in the direction of fluid flow through said housing.

16. An overtemperature shut-off valve as set forth in claim 1 wherein said biasing means includes a helical coil spring and said valve includes a disc-shaped member having a central aperture and a plurality of spaced radial arms engaging a portion of said housing, said spring being seated against and positioned by said disc-shaped member.

17. An overtemperature shut-off valve as set forth in claim 1 wherein said biasing means comprises a helical coil spring having one end supported by said housing, said one end being formed into an enlarged geometrical shape, portions of said enlarged geometrical shape engaging said housing to support said spring thereon.

18. An overtemperature shut-off valve as set forth in claim 17 wherein said one end of said spring is resiliently deformable to facilitate placement of said spring within said housing.

19. An overtemperature shut-off valve as set forth in claim 1 wherein said closure member includes a generally spherically shaped end portion engageable with said valve seat.

20. An overtemperature shut-off valve as set forth in claim 1 wherein said second portion of said passage includes guide means for guiding closing movement of said closure member and a first restricted portion adapted to cushion closing movement of said closure member, said first restricted portion being positioned between said valve seat and said closure member.

* * * * *

UNITED STATES PATENT AND TRADEMARK OFFICE
CERTIFICATE OF CORRECTION

PATENT NO. : 5,477,877
DATED : December 26, 1995
INVENTOR(S) : Klaus Schulze et al It is certified that error appears in the above-indentified patent and that said Letters Patent is hereby corrected as shown below:

On the Title Page, under "Attorney, Agent, or Firm"
"Harness, Dickey & Pierce" should be --Harness, Dickey & Pierce, P.L.C.--

On the Title Page, under "Related U.S. Application Data", "1991" should be --1992--.

Column 1, line 12, after "BACKGROUND" insert --AND--.

Column 2, line 19, "Additonally" should be --Additionally--.

Column 2, line 25, "provide" should be --provides--.

Column 3, line 4, delete ",".

Column 3, line 49, "maybe" should be --may be--.

Column 4, line 47, "an" should be --angle between ends 14 of--.

Column 4, line 57, ".realize" should be --realize--.

Signed and Sealed this

Seventeenth Day of September, 1996

Attest:

BRUCE LEHMAN

*Attesting Officer*     *Commissioner of Patents and Trademarks*